(Model.)
W. TROTTER, Jr.
WINDOW, SKYLIGHT, &c.
No. 246,841. Patented Sept. 6, 1881.
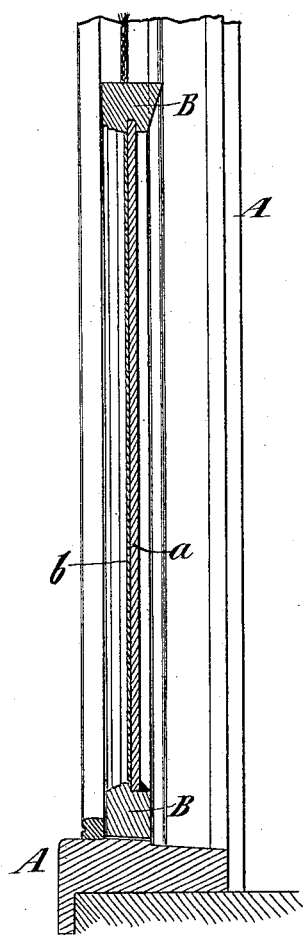
Witnesses
Inventor

UNITED STATES PATENT OFFICE.

WILLIAM TROTTER, JR., OF OYSTER BAY, NEW YORK.

WINDOW, SKYLIGHT, &c.

SPECIFICATION forming part of Letters Patent No. 246,841, dated September 6, 1881.

Application filed May 31, 1881. (Model.)

*To all whom it may concern:*

Be it known that I, WILLIAM TROTTER, Jr., of Oyster Bay, in the county of Queens and State of New York, have invented a new and useful Improvement in Windows, Skylights, and other Lights for Buildings and other Structures, of which the following is a specification.

My invention consists in the coating of the glass of windows, skylights, transom-lights, glazed doors, and other lights for houses and other buildings, and for other structures in which windows or lights are used, with a paint or composition which is both translucent and phosphorescent, admitting light to the building by day, and emitting light thereinto at night.

The accompanying drawing represents a vertical section through the lower sash of a window embodying my invention and the lower portion of the frame thereof.

Referring to the drawing, A designates the window-frame, and B the lower sash, adapted to slide vertically therein. The sash A is glazed in the usual way, $a$ designating the glass, and upon the surface of the glass is a coating, $b$, of translucent and phosphorescent composition or paint.

The paint or composition which I propose generally to use for the purpose is composed of a body of sulphide of calcium and a vehicle consisting of a varnish made with gum-mastic or other resinous body and turpentine or other spirit. This paint or composition, applied to the glass of a window, skylight, or other light, will not seriously impair its translucency, but will give it, as seen from the inside of a building by daylight, an appearance similar to ordinary ground glass. It may be applied with a brush, like ordinary paint, and, in order to protect it from the weather, should be preferably applied to the inside of the glass. The phosphorescent paint or composition thus applied will be subject during daylight to the action of light, which will excite in it the molecular action which produces its phosphorescence, and hence will every day automatically prepare itself to give a certain amount of light during the night to the interior of the building or structure.

The translucent and phosphorescent paint or composition above described may be applied to windows or lights in juxtaposition with other paints for decoration, or may have various colors mixed with it to produce various effects in daylight. Lights prepared with this paint may be used outside of stained-glass windows.

I do not confine myself to the use, in the translucent and phosphorescent paint or composition, of any particular phosphorescent body, nor to any particular vehicle. The different kinds of phosphorescent substances known emit lights of different colors and tints, and by the use of such various substances in paints for decorating windows very pleasing effects may be obtained by night.

The vehicle, instead of being turpentine or spirit-varnish, may be any of the paint-oils, water, or a solution of gelatine.

My invention is applicable not only to the windows and other lights of buildings, but also to the windows, skylights, and other lights by which railway-cars and other vehicles, steamships, steamboats, and other vessels are lighted by daylight.

I claim as my invention—

A window, skylight, or other light for a house, building, or other structure having its glass coated with a paint or composition which is both translucent and phosphorescent, and consequently capable of admitting light into the house, building, or structure by day, and of emitting light thereinto at night, substantially as herein described.

WM. TROTTER, JR.

Witnesses:
FREDK. HAYNES,
A. C. WEBB.